United States Patent
Dequina et al.

(10) Patent No.: US 8,203,359 B2
(45) Date of Patent: Jun. 19, 2012

(54) SYSTEM AND METHOD FOR OPEN LOOP MODULATION TO DETECT NARROW PWM PULSE

(75) Inventors: Noel B. Dequina, Bridgewater, NJ (US); M. Jason Houston, Cary, NC (US)

(73) Assignee: Intersil Americas Inc., Milpitas, CA (US)

( * ) Notice: Subject to any disclaimer, the term of this patent is extended or adjusted under 35 U.S.C. 154(b) by 0 days.

(21) Appl. No.: 13/034,416

(22) Filed: Feb. 24, 2011

(65) Prior Publication Data

US 2012/0074924 A1    Mar. 29, 2012

Related U.S. Application Data

(60) Provisional application No. 61/387,318, filed on Sep. 28, 2010.

(51) Int. Cl.
*H03K 19/0175* (2006.01)

(52) U.S. Cl. .............. 326/82; 326/83; 326/86; 327/109; 327/112; 323/265; 323/284; 323/285

(58) Field of Classification Search .............. 326/82–83, 326/86–87; 327/108–109, 112; 323/265, 323/282, 284–285
See application file for complete search history.

(56) References Cited

U.S. PATENT DOCUMENTS

| | | | | |
|---|---|---|---|---|
| 5,481,178 | A * | 1/1996 | Wilcox et al. | 323/287 |
| 5,994,885 | A * | 11/1999 | Wilcox et al. | 323/285 |
| 6,580,258 | B2 * | 6/2003 | Wilcox et al. | 323/282 |
| 7,262,588 | B2 * | 8/2007 | Matsuo et al. | 323/282 |
| 7,342,387 | B1 * | 3/2008 | Li | 323/282 |
| 7,868,597 | B2 * | 1/2011 | Dequina | 323/222 |
| 7,888,925 | B2 * | 2/2011 | Dequina | 323/284 |
| 2005/0128776 | A1 * | 6/2005 | Dequina et al. | 363/89 |
| 2006/0017421 | A1 * | 1/2006 | Solie et al. | 323/225 |
| 2007/0013354 | A1 * | 1/2007 | Mok et al. | 323/284 |
| 2007/0126409 | A1 * | 6/2007 | Cannella et al. | 323/282 |
| 2011/0156632 | A1 * | 6/2011 | Cheng et al. | 318/808 |

* cited by examiner

*Primary Examiner* — Jason M Crawford
(74) *Attorney, Agent, or Firm* — Gary Stanford

(57) ABSTRACT

An open loop modulation network for a voltage regulator including a latch network, an output sense network, a timing network, and pulse control logic. The latch network latches assertion of a pulse control signal and provides a corresponding latched control pulse indication. The output sense network detects initiation of an output pulse and provides a corresponding output pulse indication. The timing network initiates a delay period in response to the output pulse indication and resets the latched control pulse indication after expiration of the delay period. The pulse control logic terminates the output pulse after the latched control pulse indication is reset and the pulse control signal is negated, whichever occurs last. Very narrow input pulses are detected and either a minimum output pulse is generated or the output pulse is based on the pulse control signal.

21 Claims, 7 Drawing Sheets

SYSTEM AND METHOD FOR OPEN LOOP MODULATION TO DETECT NARROW PWM PULSE

CROSS-REFERENCE TO RELATED APPLICATIONS

This application claims the benefit of U.S. Provisional Application Ser. No. 61/387,318, filed on Sep. 28, 2010, which is hereby incorporated by reference in its entirety for all intents and purposes.

BRIEF DESCRIPTION OF THE DRAWINGS

The benefits, features, and advantages of the present invention will become better understood with regard to the following description, and accompanying drawings in which.

DETAILED DESCRIPTION

Figure 1:
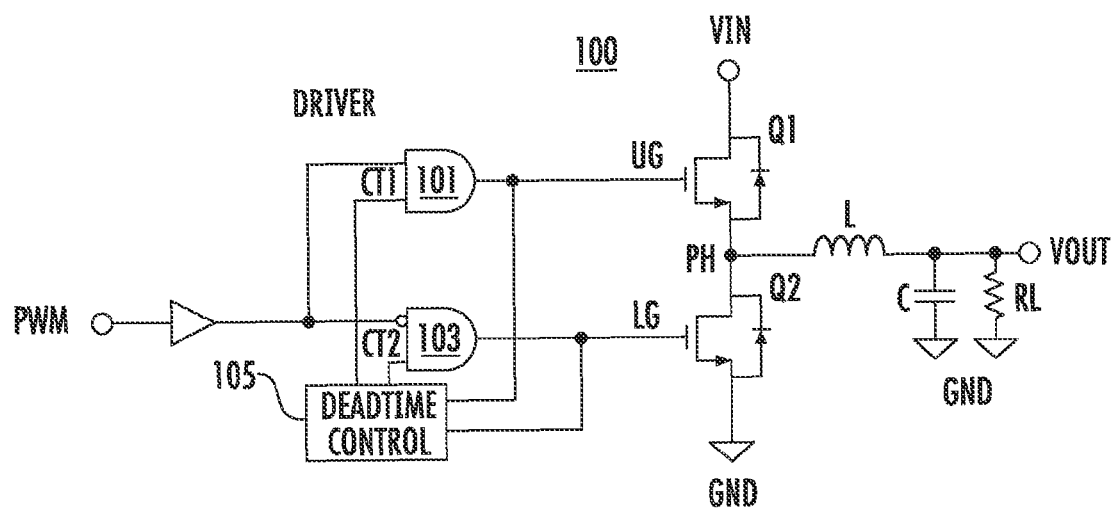
FIG. 1 is a simplified schematic diagram of a conventional output driver implementing the power stage of a switching voltage regulator.

The following description is presented to enable one of ordinary skill in the art to make and use the present invention as provided within the context of a particular application and its requirements. Various modifications to the preferred embodiment will, however, be apparent to one skilled in the art, and the general principles defined herein may be applied to other embodiments. Therefore, the present invention is not intended to be limited to the particular embodiments shown and described herein, but is to be accorded the widest scope consistent with the principles and novel features herein disclosed.

Industry trends are leading to smaller switching voltage regulator (VR) duty cycles and switch on-times from the regulator controller. Process technology improvements of integrated circuits implementing many electronic components, including, for example, microprocessors, memories, and other interface components, have significantly reduced device sizes and thus have substantially increased integration density. The reduced-size devices generally cannot tolerate higher voltage levels, so that the regulated source voltages have been decreased, such as from 3.3 Volts (V), down to 1.5 V, 1.2 V, and even down to 1 V or less. The industry trends have further led to the reduction of the size and cost of the switching regulator. The reduced output voltage levels have enabled the reduction and size of the regulator output components, including, for example, the output inductor and filter capacitor devices. The smaller devices are less costly and further allow increased switching frequency. At least one reason for increasing switching frequency is to minimize AC current power losses. Many DC-DC switching converters or switching regulators operate at several megahertz (MHz), such as 5 MHz or more. The trend towards increased switching frequency is anticipated to continue as increased system efficiency and reduced size and cost become standard requirements.

The increase of switching frequency imposes a constraint in developing a power switching driver (or power stage) that is able to properly handle narrow pulse-width modulation (PWM) pulses sent by the regulator controller. If the PWM pulse from the controller is too narrow, the power stage is unable to respond to the narrow pulse in time so that narrow PWM pulses are often skipped. Each PWM pulse, including each narrow pulse, is an indication by the controller that at least one parameter at the output, such as the output voltage VOUT, is different from a target level. The skipped pulse, therefore, results in a disturbance on the output voltage which is detrimental to output voltage regulation. In general, the relationship between the input voltage VIN, the output voltage VOUT and the PWM pulse width PW in a buck switching regulator is VOUT≈VIN*PW (in which an asterisk "*" denotes multiplication and "≈" denotes an approximation). Thus, skipped pulses result in deviation of the output voltage. The output voltage level disturbance is fed back to the controller, which responds in an attempt to maintain output voltage within the requisite tolerance levels. Pulse skipping may lead to increased output voltage ripple during low duty and/or small on-time conditions. Thus, pulse skipping potentially results in problems with AC regulation and oscillation discrepancies.

The increased voltage ripple and output voltage disturbance may potentially violate the source voltage specifications of electronic components receiving the output voltage, which may further cause erroneous operation or even failure of the electronic components. The condition of pulse skipping has been an issue in existing products using conventional switching regulators and has been observed when the part is operating in soft-start or is in a steady-state operation. One solution for avoiding these problems and to maintain optimal performance is to lower the frequency of operation of the regulator. Larger devices are usually necessary to support low frequency operation. Another solution is to maintain the higher operating frequency level of the regulator while overdesigning the output filter to either maintain optimal performance or to at least stay within specifications. Neither solution is optimal since both result in increased size and cost of the regulator.

The present disclosure describes a novel open loop modulation technique which prevents converter output voltage disturbance as a result of narrow PWM pulse skipping. In various embodiments, narrow PWM pulses are detected and the output is switched for at least a minimum duration or with a duration commensurate with the narrow PWM pulse. In certain embodiments, even extremely narrow PWM pulses are not skipped, whereas in other embodiments only extremely narrow PWM pulses may be skipped.

FIG. 1 is a simplified schematic diagram of a conventional output driver 100 implementing the power stage of a switching voltage regulator. The output driver 100 includes a pair of electronic switches Q1 and Q2 which are controlled to convert an input voltage VIN to an output VOUT on an output node. Each electronic switch is shown as an N-channel metal-oxide semiconductor, field-effect transistor (MOSFET), although alternative power switching devices are contemplated. The upper switch Q1 has its drain coupled to VIN and its source coupled to an intermediate phase node PH. The lower switch Q2 has its drain coupled to the phase node PH and its source coupled to a reference node, such as ground (GND). An output inductor L has one end coupled to the PH node and its other end coupled to the output node developing the output voltage VOUT, which is further coupled to an output filter capacitor C and a load RL, both referenced to GND. The load is illustrated as a load resistor RL although it may have more complex forms. An upper gate drive signal UG is provided to the gate of Q1 and a lower gate drive signal LG is provided to the gate of Q2. A PWM signal provided by a regulator controller (see, e.g., 1001, FIG. 10) is provided through a buffer to respective inputs of control driver logic for generating the UG and LG signals for controlling Q1 and Q2. In the simplified configuration shown, UG is driven by a first 2-input AND gate 101 and the LG signal is driven by a second 2-input AND gate 103, each having an input receiving the PWM signal. The input of the AND gate 103 receiving PWM is inverted (as indicated by an input bubble) so that the input is active low rather than high. A deadtime control module 105 has inputs receiving UG and LG and a first output providing a first control signal CT1 to another input of the AND gate 101 and a second output providing a second control signal CT2 to the other input of the AND gate 103. The AND gates 101 and 103 are power devices configured to drive the gates of the electronic power switches Q1 and Q2.

In operation, temporarily ignoring CT1 and CT2 (assuming both are high), when PWM goes high, UG is pulled high turning on Q1 and LG is pulled low turning off Q2 so that PH is effectively coupled to VIN. When PWM goes low, UG is pulled low turning off Q1 and LG is pulled high turning on Q2 so that PH is effectively coupled to GND. The current through the output inductor L charges the capacitor C and drives current to the load RL. Switching operation repeats in this manner for consecutive cycles of PWM, in which the regulator controller controls the duty cycle of PWM to regulate the voltage level of VOUT. The switching action causes a ripple voltage on VOUT, which is tolerable as long as the voltage of VOUT remains within a predetermined voltage range. The deadtime control module 105 monitors UG and LG and provides CT1 and CT2 to ensure that Q1 and Q2 are not turned on at the same time to prevent VIN from being coupled to GND through Q1 and Q2.

Figure 2:
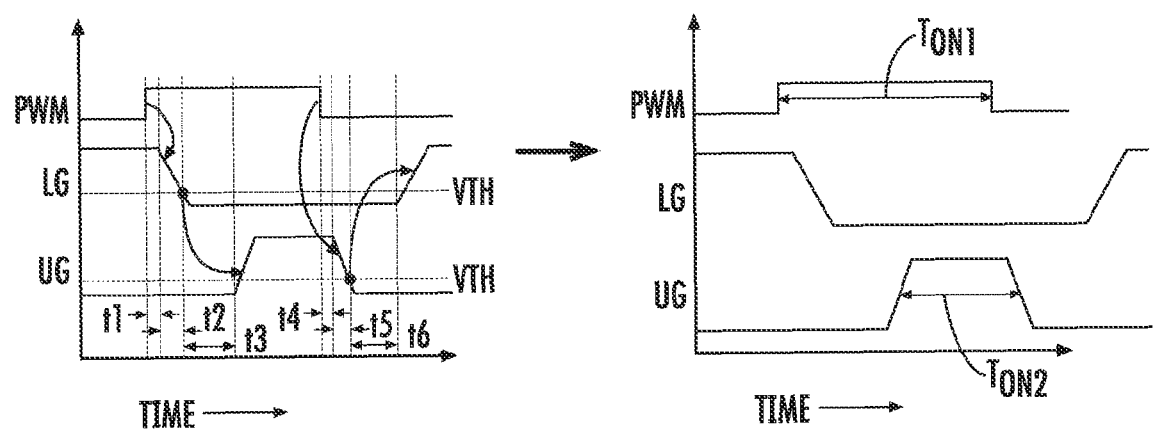
FIG. 2 shows timing diagrams illustrating operation of the conventional output driver of FIG. 1 and illustrating operation of the deadtime control module.

FIG. 2 shows timing diagrams illustrating operation of the conventional output driver 100 and illustrating operation of the deadtime control module 105. In each case, PWM, LG and UG are plotted versus time. Initially, PWM is low, LG is high so that Q2 is turned on and UG is low so that Q1 is turned off. Also, CT2 is high and CT1 is low. When PWM subsequently goes high, there is a delay t1 before LG starts falling and another delay t2 until LG falls to a low voltage level threshold VTH. In the illustrated embodiment, the low voltage level threshold VTH is about 1.75 V, in which it is understood that different switch devices may have different threshold values. In any case, once LG falls to VTH as detected by the deadtime control module 105, indicating that Q2 has been turned off, the deadtime control module 105 pulls CT2 low to ensure that Q2 remains off and then asserts CT1 high to enable Q1 to be turned on. After another delay t3, UG starts going high and eventually turns Q1 fully on to initiate the next power cycle. When PWM subsequently goes low, UG starts going low after delay t4 and reaches a threshold low level after another delay t5 indicating that Q1 is turned off. When the deadtime control module 105 detects that UG has fallen to a low voltage level threshold (e.g., VTH) indicating that Q1 is off, it asserts CT1 low to ensure that Q1 remains off and then asserts CT2 high to enable Q2 to be turned on. After a delay t6, LG starts going high and is eventually asserted high to turn Q2 back on.

Some of the delays t1-t6 may be exaggerated to more clearly illustrate the switching delays during each cycle of the conventional configuration. Q2 generally conducts more than Q1, so that Q2 is typically significantly larger than Q1 to minimize losses. Thus, there are usually greater delays for turning Q2 on and off as compared to the delays for turning Q1 on and off. As illustrated in FIG. 2, there is a relatively significant delay pulling LG low and asserting UG high after the beginning of the PWM pulse as compared to simply pulling UG low after the end of the PWM pulse. The PWM pulse has a width of $T_{ON1}$ whereas the width of UG is $T_{ON2}$, in which $T_{ON2}$ is shown shorter than $T_{ON1}$ because of the driver propagation and deadtime delays. As the pulse width $T_{ON1}$ of PWM at the input of the driver 100 becomes shorter, the pulse width $T_{ON2}$ on UG decreases accordingly and may decrease to a point at which $T_{ON1}$ is small but is not zero while $T_{ON2}$ goes to zero so that the UG pulse does not occur. Alternatively, even if UG does spike high, Q1 is not turned on or is not turned on for a sufficient period of time to completely switch the output. Either way, the PWM pulse is not propagated to the PH node resulting in a "skipped" PWM pulse which may cause an undesirable disturbance of the output voltage.

Figure 3:
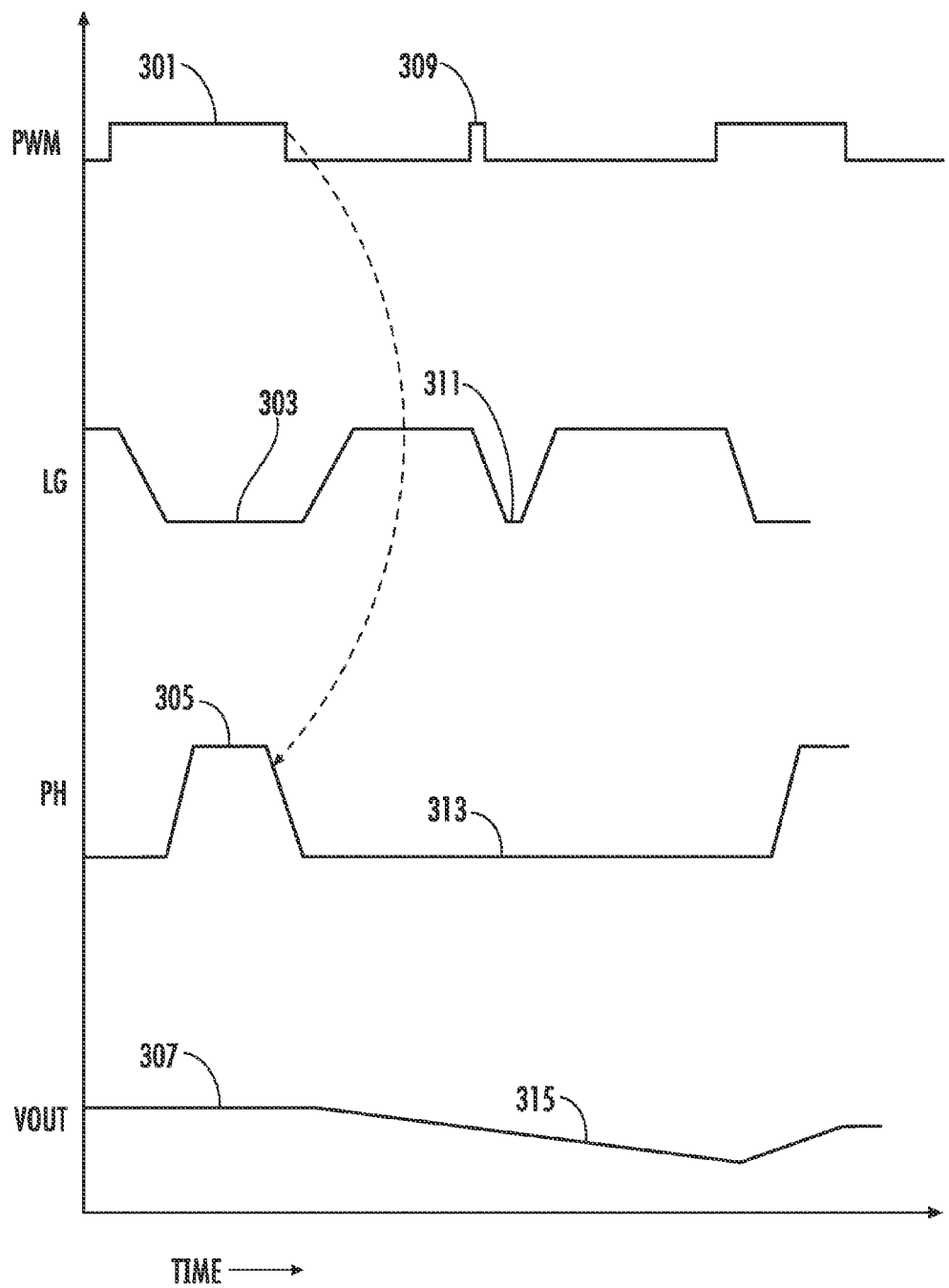
FIG. 3 is a graph plotting the voltages of PWM, LG, PH and VOUT for the conventional output driver of FIG. 1 illustrating a skipped PWM pulse and resulting output disturbance on the output voltage.

FIG. 3 is a timing diagram in which the voltages of PWM, LG, PH and VOUT are plotted versus time for the conventional output driver 100 illustrating a skipped PWM pulse and resulting output disturbance on VOUT versus time. A first pulse 301 on PWM causes LG to go low as shown at 303 which results in UG going high (not shown). LG going low and UG going high causes a corresponding "pulse" 305 on PH according to normal operation. As shown at 307, VOUT remains relatively stable. A second pulse 309 on PWM is relatively narrow. The pulse 309 is sufficiently long to cause LG to go low as shown at 311. The duration of LG low is sufficiently short such that there is no corresponding pulse on PH as shown at 313. Thus, the pulse 309 on PWM is skipped. The skipped pulse 309 causes a disturbance of VOUT, which is shown decreasing at 315. A single disturbance might be sufficient to cause VOUT to violate tolerance specifications. Multiple skipped pulses over time, such as during low duty or small on-time conditions, causes significant VOUT disturbances as previously described, including significant voltage ripple and a substantially increased likelihood of failing regulation requirements. In one embodiment, PWM pulses with durations of about 100 nanoseconds (ns) or less may be skipped using the conventional configurations.

Figure 4:
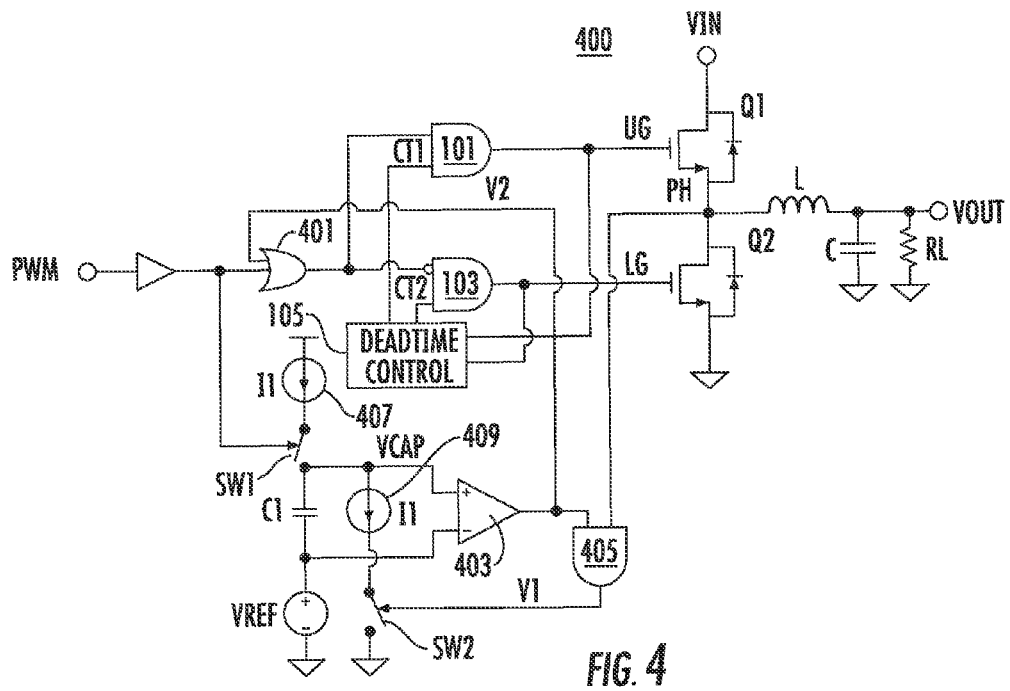
FIG. 4 is a schematic diagram of an output driver with open loop modulation according to one embodiment of the present invention.
Figure 5:
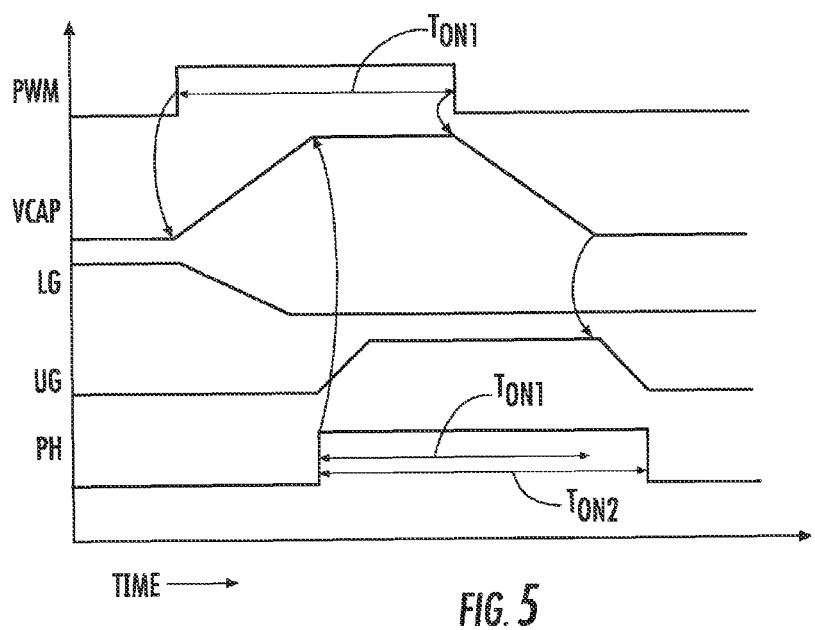
FIG. 5 is a timing diagram illustrating operation of the output driver of FIG. 4.

FIG. 4 is a schematic diagram of an output driver 400 with open loop modulation according to one embodiment, and FIG. 5 is a timing diagram illustrating operation of the output driver 400. The output driver 400 includes similar components as the output driver 100 in which similar components assume identical reference numerals. PWM is instead provided to one input of an OR gate 401 receiving a voltage signal V2 at its other input and having its output coupled to the inverting input of the AND gate 103 and to one input of the AND gate 101. The output of the OR gate 401 is an output control signal provided to the AND gates 101 and 103 rather than PWM. In FIG. 5, PWM is plotted along with VCAP, LG, UG and PH versus time. VCAP is the voltage at one end of a capacitor C1, having another end referenced to a reference voltage VREF. A comparator 403 senses a positive voltage across the capacitor C1 and causes the voltage signal V2 to go high. V2 represents a latched version of a pulse on PWM. V2 is low when the voltage across the capacitor C1 is very low, zero, or negative. Initially, PWM is low, LG is high so that Q2 is on, UG is low so that Q1 is off, and PH is low. The deadtime control module 105 operates in the same manner as previously described so that CT2 is high and CT1 is low. When PWM goes high, it closes a switch SW1 coupling a current source 407 to charge the capacitor C1 with a current I1. Thus, VCAP ramps up as C1 is charged. When VCAP rises, the comparator 403 switches pulling V2 high so that the OR gate 401 continues to keep its output high. LG ramps down to turn Q2 off. When LG reaches a predetermined low threshold, CT2 goes low and CT1 goes high and AND gate 101 ramps UG up to turn Q1 on. The deadtime control module 105 controls the switching between LG and UG in substantially the same manner as previously described, except that the OR gate 401 as controlled by V2 prevents premature termination of the LG and UG pulses in response to a narrow PWM pulse.

At about the time UG starts going high, PH goes high. PH and V2 are provided to respective inputs of another 2-input AND gate 405. The AND gate 405 asserts a voltage signal V1 high when PH and V2 are both high, which closes a switch SW2 to activate a current sink 409 to discharge the capacitor C1 with the current I1. V1 represents an output pulse indication on the phase node PH. Thus, when PH goes high, VCAP stops ramping up and remains at a steady voltage level (as long as PWM is still high) since being both charged and discharged with the current I1. It is noted that a very narrow pulse on PWM causes VCAP to stop rising early. Nonetheless, even a relatively small voltage of VCAP causes the comparator 403 to keep V2 high so that the pulse on PH is initiated in either case. When PWM goes low, the switch SW1 is opened while switch SW2 remains closed since V1 is still high, so that the current source 407 no longer sources current I1 while the current sink 409 discharges the capacitor C1 with current I1. Thus, VCAP ramps down as the capacitor C1 is discharged. When VCAP is discharged down to the voltage level of VREF or less, the comparator 403 pulls V2 low switching the OR gate 401 causing the AND gate 101 to pull UG low. When UG goes low the PH pulse is completed.

For the output driver 400, as long as PWM is sensed going high, UG is pulled high to initiate a pulse on PH regardless of the width of the pulse on PWM. Thus, as long as PWM goes high even for a very short period of time, UG goes high to initiate a power cycle. The voltage on the capacitor C1 keeps VCAP sufficiently above VREF to keep UG high and thus to keep PH active. When PWM goes low and PH is high, VCAP decreases until it reaches VREF, at which point the UG pulse is terminated to complete the pulse on PH. Thus, PWM going high starts charging C1, which trips the comparator 403 pulling V2 high effectively latching a high output on the OR gate 401. UG eventually goes high pulling PH high to initiate a power cycle. The power cycle is initiated even if the pulse on PWM is very short. PH going high either suspends charging of C1 if PWM is still high or begins discharging C1 if PWM is already low. The width of the pulse on PH depends on the voltage of the capacitor C1. It is noted that the width $T_{ON2}$ of the pulse on PH may be slightly longer than the width $T_{ON1}$ of the pulse on PWM. Nonetheless, pulses on PWM are not skipped and the regulator controller is able to compensate for slightly longer pulses on PH. In this manner, a pulse occurs on PH for every pulse of PWM even for very narrow widths of PWM.

Figure 6:
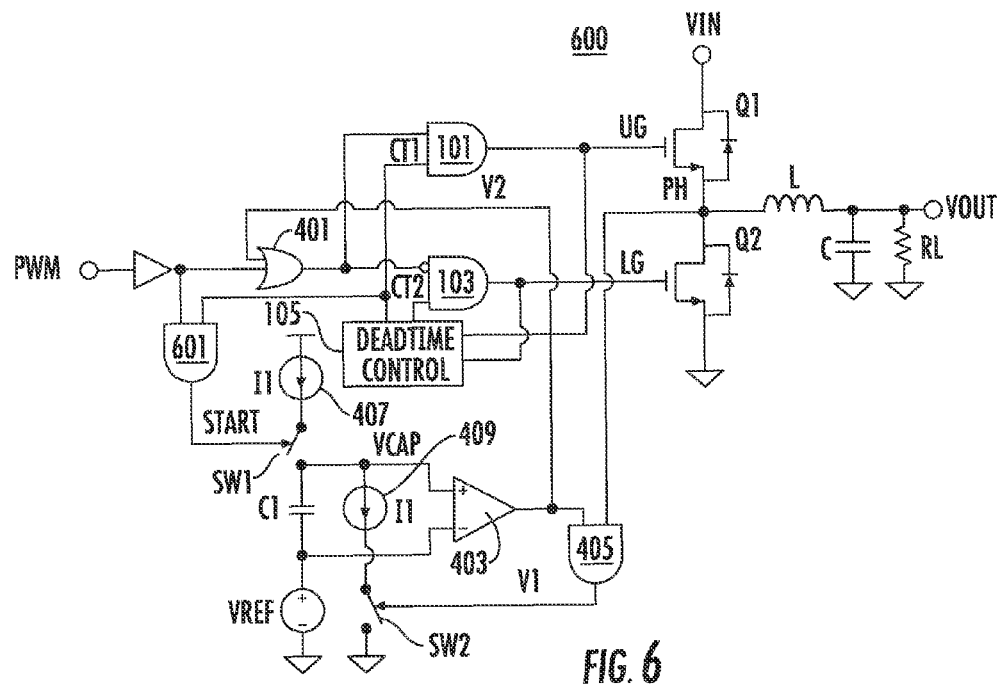
FIG. 6 is a schematic diagram of an output driver with open loop modulation according to another embodiment of the present invention.
Figure 7:
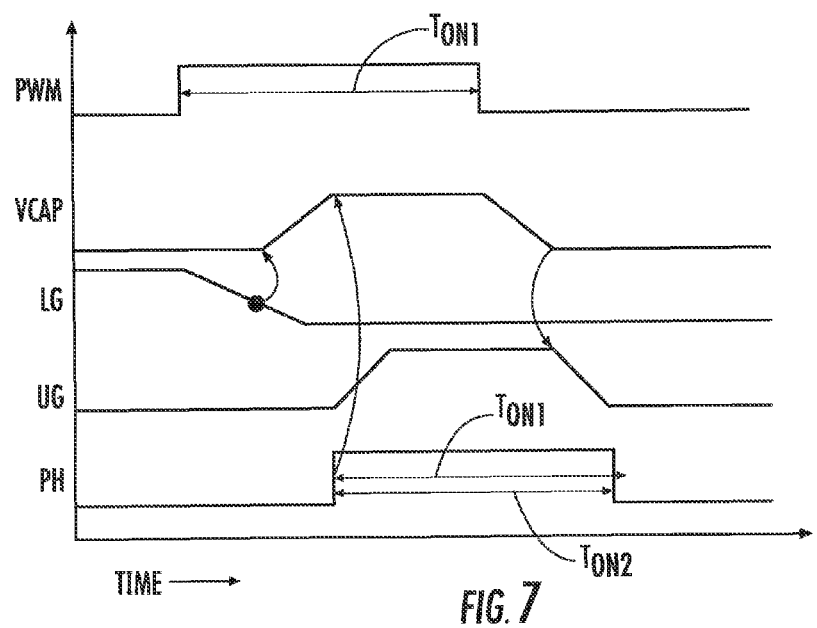
FIG. 7 is a timing diagram illustrating operation of the output driver of FIG. 6.

FIG. 6 is a schematic diagram of an output driver 600 with open loop modulation according to another embodiment, and FIG. 7 is a timing diagram illustrating operation of the output driver 600. In FIG. 7, PWM is plotted along with VCAP, LG, UG and PH versus time. The output driver 600 is similar to the output driver 400 in which similar components assume identical reference numbers. In this case a 2-input AND gate 601 is added which has its first input receiving PWM, its other input coupled to receive signal CT2 from the deadtime control module 105, and an output providing a start signal to control the switch SW1. Operation is similar except that charging of the capacitor C1 is not triggered upon the rising edge of PWM but instead is triggered when LG falls to the threshold low voltage level. Thus, when PWM goes high, the AND gate 103 begins pulling LG low in the same manner as for the output driver 400. When LG reaches the low voltage level threshold (e.g., VTH), the deadtime control module 105 asserts the other input of the AND gate 601 high to begin charging the capacitor C1 to increase VCAP and pull V2 high. Remaining operation for the cycle is substantially similar to that of the output driver 400.

For the output driver 600, the initiation of charging the capacitor C1 starts a little later when LG falls to the threshold level rather than upon the rising edge of PWM. PH going high begins discharging the capacitor C1, and the width of the pulse on PH depends on the voltage of the capacitor C1. In this case, the width $T_{ON2}$ of the pulse on PH is reduced and is closer to the width $T_{ON1}$ of the pulse on PWM as shown in FIG. 7. Thus, the pulse on PH is usually not longer than the pulse on PWM. It is noted, however, that the delay of charging of C1 may result in the skipping of extremely narrow pulses of PWM. The extremely narrow pulses may be similar to voltage spikes which do not appreciably affect the output voltage VOUT in most cases so that the benefits are maintained. In one embodiment, the threshold PWM duration of skipped pulses is reduced from 100 ns down to about 20 ns providing significant improvement.

Figure 8:
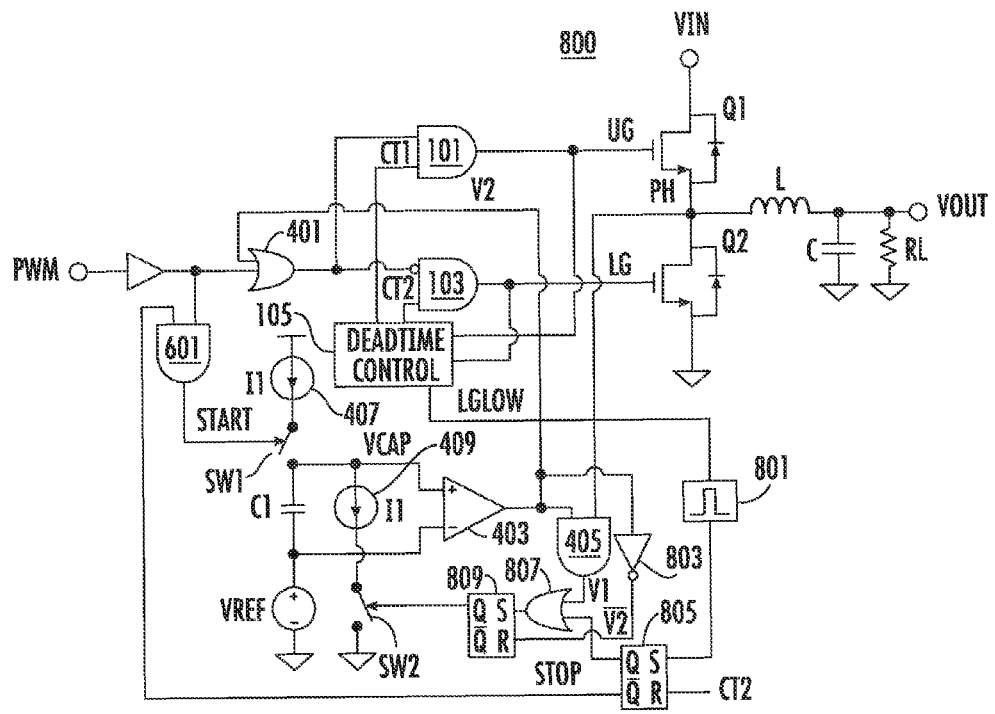
FIG. 8 is a schematic diagram of an output driver with open loop modulation according to yet another embodiment of the present invention.
Figure 9:
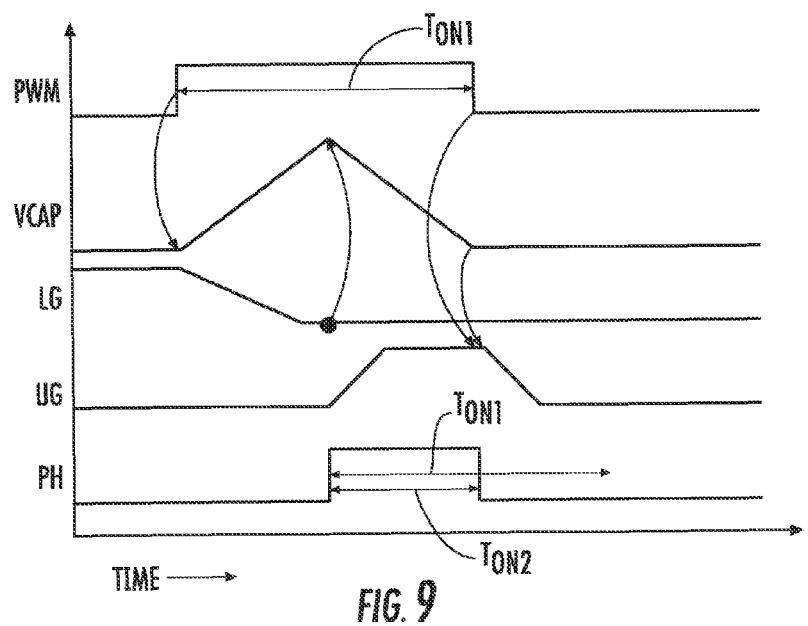
FIG. 9 is a timing diagram illustrating operation of the output driver of FIG. 8.

FIG. 8 is a schematic diagram of an output driver 800 with open loop modulation according to one embodiment, and FIG. 9 is a timing diagram illustrating operation of the output driver 800. In FIG. 9, PWM is plotted along with VCAP, LG, UG and PH versus time. The output driver 800 is similar to the output driver 600 in which similar components assume identical reference numbers. Additional logic and devices, including one-shot pulse device 801, inverter 803, set-reset flip-flop (SRFF) 805, 2-input OR gate 807 and SRFF 809 are provided. The deadtime control module 105 asserts a signal LGLOW high when LG is sensed at its low threshold level, in which LGLOW is provided to an input of the pulse device 801. The output of pulse device 801 is provided to the set input of SRFF 805, receiving signal CT2 at its reset input. The Q output of SRFF 805 is provided to one input of OR gate 807, which receives signal V1 from the output of AND gate 405 at its other input. The inverter 803 receives signal V2 and provides at its output an inverted version of V2, shown as $\overline{V2}$. The output of OR gate 807 is provided to the set input of SRFF 809, which receives $\overline{V2}$ at its reset input and which has its Q output coupled to the control input of the switch SW2. The $\overline{Q}$ output of SRFF 805 is a stop signal which provided to one input of the AND gate 601, which receives PWM at its other input and which has its output coupled to the control input of the switch SW1. Remaining devices are coupled in similar manner as previously described.

When PWM is low, CT2 is initially high so that SRFF 805 is reset pulling its $\overline{Q}$ output high. The AND gate 601 is coupled to pass the PWM pulse to turn on the switch SW1 when PWM rises. Thus, the initial charging of the capacitor C1 to trigger V2 is substantially the same as the output driver 400 so that VCAP begins ramping up as soon as PWM goes high pulling V2 high. When LG falls to the lower threshold, CT2 is pulled low and LGLOW is asserted so that pulse device 801 pulses its output high after a short delay. The Q output of SRFF 805 goes high and its $\overline{Q}$ output goes low to pull the output of the AND gate 601 back low. The AND gate 601 re-opens the switch SW1 so that the capacitor C1 is no longer being charged. Further, OR gate 807 pulls its output high to set SRFF 809 to close switch SW2 to begin discharging the capacitor C1. In this manner, the duration of charge on the capacitor C1 is shorter to shorten the pulse on PH. The pulse on PH is terminated when the PWM pulse goes low and when VCAP discharges back to VREF.

As shown in FIG. 9, for the output driver 800, the width $T_{ON2}$ of the pulse on PH may be shorter than the width $T_{ON1}$ of the pulse on PWM. The pulse device 801 ensures that a pulse of at least a minimal duration appears on PH even for very narrow pulses on PWM. Thus, PWM pulses are not skipped, narrow PWM pulses are corrected, and longer PWM pulses generally remain unaffected.

Figure 10:
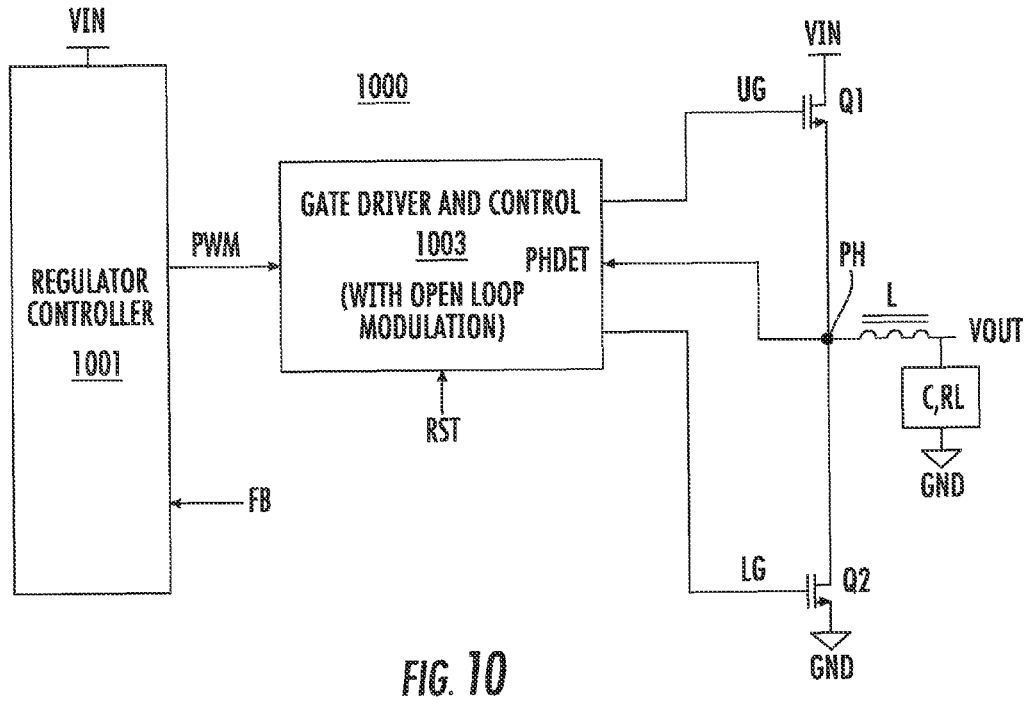
FIG. 10 is a simplified block diagram of a DC-DC converter using open loop modulation according to one embodiment of the present invention.
Figure 11:
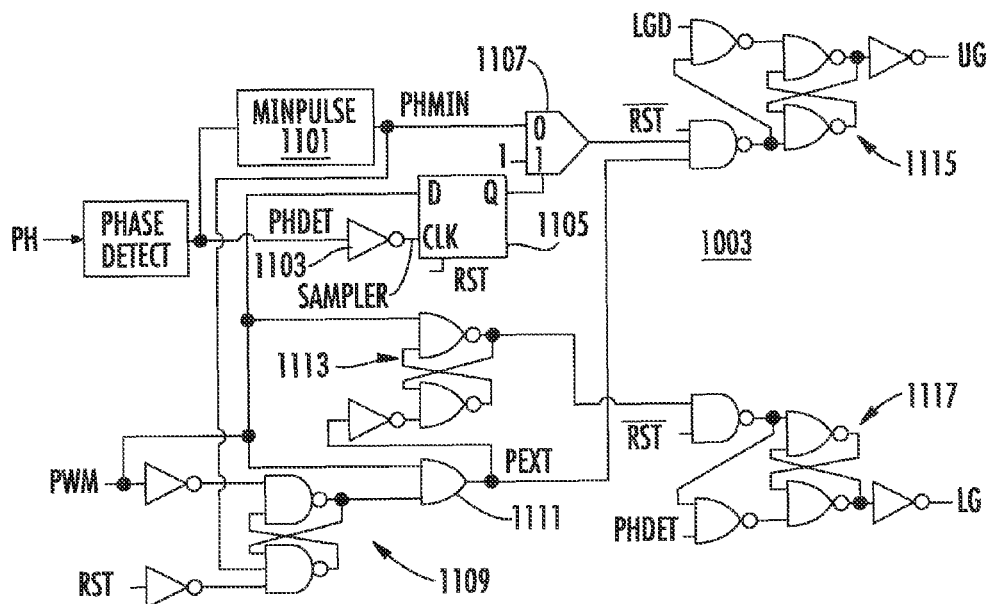
FIG. 11 is a digital logic implementation of open loop control logic according to one embodiment of the present invention.
Figure 12:
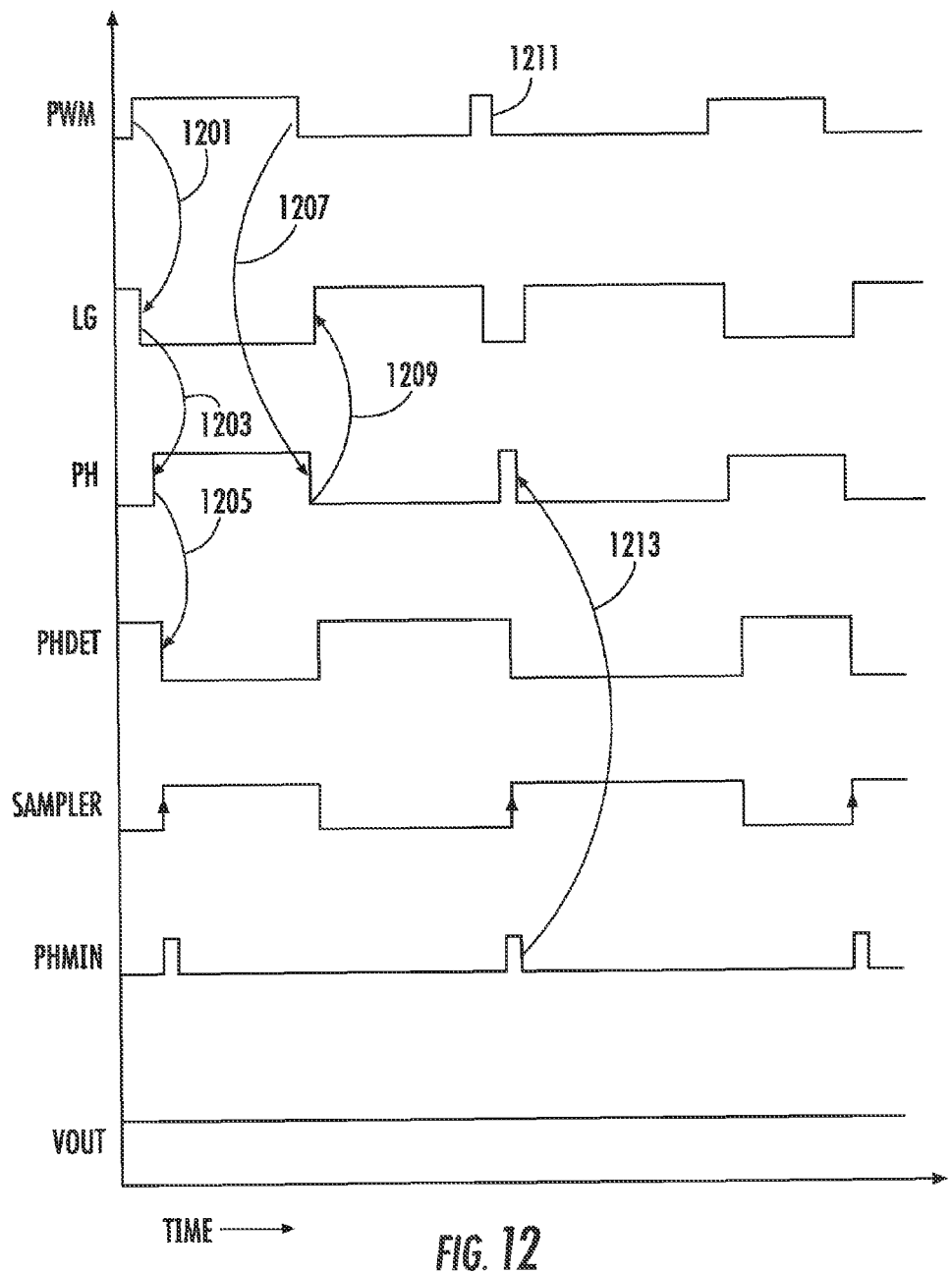
FIG. 12 is a timing diagram illustrating operation of the open loop control logic.

FIG. 10 is a simplified block diagram of a DC-DC converter 1000 including a gate driver and control network 1003 using open loop modulation according to one embodiment, FIG. 11 is a digital logic implementation of the gate driver and control network 1003 according to one embodiment, and FIG. 12 is a timing diagram illustrating operation of the gate driver and control network 1003. As shown in FIG. 10, a regulator controller 1001 develops the PWM signal provided to the gate driver and control network 1003, which provides the upper gate UG and lower gate LG signals to the gates of Q1 and Q2, respectively. Q1 and Q2 are coupled between VIN and ground with an intermediate phase node PH as previously described, which is provided to one end of the output inductance L. The other end of L develops VOUT which is provided to output capacitor C and load RL coupled between VOUT and ground. At least one output parameter (e.g., output voltage VOUT, output current, etc.) is sensed or otherwise detected to develop feedback information FB, which is provided back to the regulator controller 1001 and used to develop the PWM signal for regulating the output parameter (s), such as the voltage level of VOUT. The gate driver and control network 1003 incorporates open loop modulation for analyzing the incoming PWM pulse width and for determining whether the pulse width is sufficiently wide or is a narrow pulse. The pulse width determination is based on the phase node PH rising edge which is used as a clock to determine the state of the incoming PWM.

FIG. 11 is a schematic and block diagram of the gate driver and control network 1003 according to one embodiment. A phase detection network 1102 has an input coupled to PH and an output generating a signal PHDET, which is an active high signal used to detect the falling of the phase node PH. A one-shot MINPULSE module 1101 receives PHDET and generates a minimum pulse on a signal PHMIN to ensure a minimum pulse duration on the phase node PH in the event of a narrow PWM pulse. In one embodiment, each pulse of PHMIN is approximately 20 ns. PHDET is also provided to an inverter 1103, which outputs a signal SAMPLER which is used as a clock to sample PWM. As shown, a D-type flip-flop (DFF) 1105 receives PWM at its D input, receives SAM-PLER at its CLK input, and has its Q output coupled to the select input of a multiplexer 1107. A reset signal RST is used to reset the network during power up or during other reset conditions. A signal LGD is a detected version of LG. The multiplexer 1107 is used to initially select PHMIN to ensure at least a minimum pulse on PH in the event PWM goes back low before the phase node PH is asserted high. When PWM goes high, OR gate 1111 asserts a PWM extension signal PEXT high. A latch 1109 has a set input which detects PWM going high and latches its output high to keep PEXT high even if the pulse on PWM is short pulling PWM back low. PHMIN is provided to a reset input of the latch 1109. Another latch 1113 has a set input which detects PWM going high and asserts its output to lower driver logic 1117, which pulls LG low. PEXT is provided to a reset input of the latch 1113. LGD detects LG low and causes upper driver 1115 to assert UG high, which initiates a pulse on PH. PHDET goes low in response to PH going high to initiate a pulse on PHMIN and causing SAMPLER to go high to clock DFF 1105. If PWM remains high long enough, DFF 1105 switches to select the "1" input of multiplexer 1107 to keep UG high for as long as PWM remains high. If PMW goes low before being sampled by DFF 1105, then multiplexer 1107 selects PHMIN to ensure a minimum pulse on PH.

The timing diagram of FIG. 12 plots PMW, LG, PH, PHDET, SAMPLER, PHMIN and VOUT versus time. The rising edge of PWM causes LG to go low (arrow 1201) which reaches the lower threshold driving PH high (arrow 1203). PH going high drives PHDET low (arrow 1205), which drives SAMPLER high and initiates a pulse on PHMIN. The pulse on PWM is sufficiently long so that PH remains high. A subsequent falling edge of PWM drives PH low (arrow 1207), and when PH reaches a low threshold (e.g., 0.8 V), LG is driven high (arrow 1209). The switching operation holds as long as the PWM pulse is sufficiently long. When a narrow pulse 1211 occurs on PWM, a switching transition from LG to PH rising might not otherwise occur due to early termination of the PWM pulse. To prevent a skipped PWM pulse, the minimum pulse on PHMIN enables a corresponding minimum pulse to occur on PH (arrow 1213).

A rising PWM signal switches LG off and drives UG high to initiate a pulse on the phase node PH. In this case, regardless of the actual width of PWM, PH goes high for at least a minimal amount of time so that no PWM pulses are skipped, including narrow PWM pulses. SAMPLER is used to determine (sample) the state of PWM. If the rising edge of SAMPLER signifies a PWM high then the off transition of PH is decided by the falling edge of PWM. If SAMPLER samples a PWM low (narrow pulse), then the off transition of PH is decided by the pulse on PHMIN having a predetermined minimum pulse width (e.g., 10-20 ns or any other suitable or arbitrary pulse width). In either case, the LG transition is based from the falling threshold of PH. In this manner, even when PWM is very narrow, PH is transitioned at the output so that there is no disturbance on VOUT.

Although the present invention has been described in considerable detail with reference to certain preferred versions thereof, other versions and variations are possible and contemplated. Those skilled in the art should appreciate that they can readily use the disclosed conception and specific embodiments as a basis for designing or modifying other structures for providing the same purposes of the present invention without departing from the spirit and scope of the invention as defined by the following claim(s).

The invention claimed is:

1. An open loop modulation network for a voltage regulator, comprising:

a latch network which latches assertion of a pulse control signal and which provides a corresponding latched control pulse indication;

an output sense network which detects initiation of an output pulse and which provides a corresponding output pulse indication;

a timing network which initiates a delay period in response to at least one of said output pulse indication and deassertion of said pulse control signal, and which resets said latched control pulse indication after expiration of said delay period; and a pulse control logic which terminates said output pulse after reset of said latched control pulse indication and deassertion of said pulse control signal have both occurred.

2. The open loop modulation network of claim 1, wherein:
said latch network and said timing network collectively comprises:
  a capacitance;
  a comparator having an input coupled to said capacitance and an output providing said latched control pulse indication; and
  a current network which charges said capacitance after assertion of said pulse control signal and which discharges said capacitance after both assertion of said output pulse indication and deassertion of said pulse control signal;
wherein said output sense network comprises output control logic which detects said output pulse and receives said latched control pulse indication and which provides said output pulse indication; and
wherein said pulse control logic comprises second control logic which receives said latched control pulse indication and said pulse control signal and which provides an output control signal.

3. The open loop modulation network of claim 1, wherein said voltage regulator asserts an upper gate drive signal and a lower gate drive signal, and wherein:
said latch network and said timing network collectively comprises:
  a capacitance;
  a comparator having an input coupled to said capacitance and an output providing said latched control pulse indication;
  start control logic which receives said pulse control signal and a gate control signal indicating a state of the lower gate drive signal and which provides a start signal; and
  a current network which charges said capacitance after both assertion of said pulse control signal and said start signal, and which discharges said capacitance after both assertion of said output pulse indication and deassertion of said pulse control signal;
wherein said output sense network comprises output control logic which detects said output pulse and receives said latched control pulse indication and which provides said output pulse indication; and
wherein said pulse control logic receives said latched control pulse indication and said pulse control signal and which provides an output control signal.

4. The open loop modulation network of claim 1, wherein said voltage regulator asserts an upper gate drive signal and a lower gate drive signal, and wherein:
said latch network and said timing network collectively comprise:
  a capacitance;
  a comparator having an input coupled to said capacitance and an output providing said latched control pulse indication;
  delay logic which provides a gate control signal indicating a delayed state of the lower gate drive signal and which provides a stop signal; and
  a current network which charges said capacitance after assertion of said pulse control signal and which discharges said capacitance after both assertion of said output pulse indication and assertion of said stop signal;
wherein said output sense network comprises output control logic which detects said output pulse and receives said latched control pulse indication and which provides said output pulse indication; and
wherein said pulse control logic receives said latched control pulse indication and said pulse control signal and which provides an output control signal.

5. The open loop modulation network of claim 4, wherein said delay logic comprises:
  a deadtime controller which asserts a detection signal when the lower gate drive signal is detected low; and
  a delay device which asserts said stop signal after a predetermined delay after the lower gate drive signal is detected low.

6. The open loop modulation network of claim 1, wherein said voltage regulator asserts an upper gate drive signal and a lower gate drive signal, and wherein:
said latch network comprises a reset input;
wherein said timing network comprises a pulse generator which generates a minimum pulse when said output pulse indication is provided, wherein said minimum pulse has a predetermined width and is provided to said reset input of said latch network; and
wherein said pulse control network comprises:
  a latch which latches a state of said pulse control signal when said output pulse indication is provided and which provides a select signal indicative thereof;
  select logic which receives said minimum pulse and said select signal, which selects said minimum pulse when said pulse control signal is negated when said output pulse is provided, and which provides a selected duration signal; and
  output control logic which receives said selected duration signal and said latched control pulse indication and which provides an output control signal.

7. A gate driver with open loop modulation for a voltage regulator with an output phase node, said gate driver comprising:
an upper gate driver which receives an output control signal and an upper deadtime control signal and which provides an upper gate drive signal;
a lower gate driver which receives said output control signal and a lower deadtime control signal and which provides a lower gate drive signal;
a deadtime controller having inputs receiving said upper and lower gate driver signals and outputs providing said upper and lower deadtime control signals, wherein said deadtime controller asserts said upper deadtime control signal after said lower gate drive signal is detected negated, and wherein said deadtime controller asserts said lower deadtime control signal when said upper gate drive signal is detected negated; and
an open loop modulation network, comprising:
  a latch network which latches assertion of a pulse control signal and which provides a corresponding latched control pulse indication;

an output sense network which detects initiation of an output pulse on the output phase node and which provides a corresponding output pulse indication;

a timing network which initiates a delay period in response to at least one of said output pulse indication and deassertion of said pulse control signal, and which resets said latched control pulse indication after expiration of said delay period; and a pulse control network which controls said output control signal to initiate said output pulse, and to terminate said output pulse after reset of said latched control pulse indication and deassertion of said pulse control signal have both occurred.

8. The gate driver of claim 7, wherein:
said latch network and said timing network comprises:
  a capacitance;
  a switched current source having an output which charges said capacitance while said pulse control signal is asserted;
  a switched current sink having an output which discharges said capacitance while said output pulse indication is provided; and
  a comparator having an input coupled to said capacitance and an output providing said latched control pulse indication;
wherein said output sense network comprises an AND logic gate having a first input for coupling to the phase node, a second input receiving said latched control pulse indication, and an output providing said output pulse indication; and
wherein said pulse control network comprises an OR logic gate having a first input receiving said pulse control signal, a second input receiving said latched control pulse indication, and an output providing said output control signal.

9. The gate driver of claim 7, wherein:
said latch network and sand timing network comprises:
  a first AND logic gate having a first input receiving said pulse control signal, a second input receiving said upper deadtime control signal, and an output providing a start signal;
  a capacitance;
  a switched current source having an output which charges said capacitance while said start signal is provided;
  a switched current sink having an output which discharges said capacitance while said output pulse indication is provided; and
  a comparator having an input coupled to said capacitance and an output providing said latched control pulse indication;
wherein said output sense network comprises a second AND logic gate having a first input for coupling to the phase node, a second input receiving said latched control pulse indication, and an output providing said output pulse indication; and
wherein said pulse control network comprises an OR logic gate having a first input receiving said pulse control signal, a second input receiving said latched control pulse indication, and an output providing said output control signal.

10. The gate driver of claim 7, wherein:
said latch network and said timing network comprises:
  a delay network which asserts a delay signal upon expiration of a predetermined delay after said lower gate drive signal is detected low;
  a capacitance;
  a switched current source having an output which charges said capacitance when said pulse control signal is asserted and which stops charging said capacitance when said delay signal is provided;
  a switched current sink having an output which discharges said capacitance when either one of said output pulse indication is provided and said delay signal is provided; and
  a comparator having an input coupled to said capacitance and an output providing said latched control pulse indication;
wherein said output sense network comprises an AND logic gate having a first input for coupling to the phase node, a second input receiving said latched control pulse indication, and an output providing said output pulse indication; and
wherein said pulse control network comprises an OR logic gate having a first input receiving said pulse control signal, a second input receiving said latched control pulse indication, and an output providing said output control signal.

11. A gate driver with open loop modulation for a voltage regulator with an output phase node, said gate driver comprising:
  a latch network which latches assertion of a pulse control signal;
  a lower gate driver coupled to said latch network which negates a lower gate drive signal after assertion of said pulse control signal is latched;
  a minimum pulse generator which generates a minimum pulse signal when an output pulse is detected on the phase node; and
  an upper gate driver coupled to said latch network which asserts an upper gate drive signal after said pulse control signal is latched and said lower gate drive signal is detected negated, and which negates said upper gate drive signal after both said minimum pulse signal is completed and said pulse control signal is negated.

12. The gate driver of claim 11, wherein said latch network comprises:
  a first latch having a set input receiving said pulse control signal, a reset input receiving said minimum pulse signal, and an output providing a first latch signal;
  a first logic gate having a first input receiving said pulse control signal, a second input receiving said first latch signal and an output providing a pulse extension signal to said upper gate driver; and
  a second latch having a set input receiving said pulse control signal, a reset input receiving said pulse extension signal, and an output providing a second latch signal to said lower gate driver.

13. The gate driver of claim 11, further comprising:
  said upper gate driver having a control logic gate receiving said pulse extension signal and a pulse duration signal and providing an upper gate enable signal;
  a phase detection network which provides a phase detect signal when said output pulse is detected on the phase node;
  a sampler having a data input receiving said pulse control signal, a clock input receiving said phase detect signal, and an output providing a select signal; and
  select logic having an input receiving said minimum pulse signal and an output providing said pulse duration signal.

14. A method of open loop modulation for a driver of a voltage regulator, comprising:

latching assertion of a pulse control signal and providing a latched pulse control signal;

providing the latched pulse control signal to the driver to initiate an output pulse;

detecting assertion of the output pulse and providing an output pulse indication;

initiating a delay period after at least one of receiving the output pulse indication and deassertion of the pulse control signal; and terminating the output pulse after the last to occur between expiration of the delay period and deassertion of the pulse control signal.

15. The method of claim 14, wherein said latching comprises:

charging a capacitance; and detecting when voltage across the capacitance is above a predetermined level.

16. The method of claim 14, wherein said latching comprises setting a latch device.

17. The method of claim 14, wherein said latching comprises latching when the pulse control signal is asserted and when a lower gate signal is detected negated.

18. The method of claim 14, wherein said initiating a delay period comprises discharging a capacitor.

19. The method of claim 14, wherein said initiating a delay period comprises activating a pulse generation device.

20. The method of claim 14, further comprising clearing the latched pulse control signal after detecting negation of a lower gate signal and after expiration of a second delay period.

21. The method of claim 14, further comprising:

sampling a state of the pulse control signal when the output pulse indication is provided;

wherein said terminating comprises terminating based on the delay period when the pulse control signal is sampled negated; and wherein said terminating comprises terminating based on the state of the pulse control signal when the pulse control signal is sampled asserted.

* * * * *